(12) United States Patent
Sugiura

(10) Patent No.: US 9,171,356 B2
(45) Date of Patent: Oct. 27, 2015

(54) CYCLIC NOISE REMOVAL IN BOREHOLE IMAGING

(71) Applicant: Schlumberger Technology Corporation, Sugar Land, TX (US)

(72) Inventor: Junichi Sugiura, Bristol (GB)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 14/223,834

(22) Filed: Mar. 24, 2014

(65) Prior Publication Data
US 2014/0205201 A1      Jul. 24, 2014

Related U.S. Application Data

(60) Division of application No. 12/911,851, filed on Oct. 26, 2010, now Pat. No. 8,682,102, which is a continuation-in-part of application No. 12/486,954, filed on Jun. 18, 2009, now Pat. No. 8,655,104.

(51) Int. Cl.
  *G06T 5/00*   (2006.01)
  *G01V 1/48*   (2006.01)
  *G06T 5/10*   (2006.01)

(52) U.S. Cl.
  CPC . *G06T 5/002* (2013.01); *G01V 1/48* (2013.01); *G06T 5/10* (2013.01)

(58) Field of Classification Search
  None
  See application file for complete search history.

(56) References Cited

U.S. PATENT DOCUMENTS

| 4,021,774 | A | * | 5/1977 | Asmundsson et al. ..... 340/853.8 |
| 4,039,042 | A | | 8/1977 | Edwards et al. |
| 4,763,258 | A | | 8/1988 | Engelder |
| 5,473,158 | A | | 12/1995 | Holenka et al. |
| 5,579,248 | A | * | 11/1996 | Nieto et al. ..... 702/6 |
| 5,721,694 | A | | 2/1998 | Graupe |
| 5,734,579 | A | * | 3/1998 | Sakaguchi ..... 702/78 |
| 5,816,346 | A | | 10/1998 | Beaton |
| 6,049,757 | A | | 4/2000 | Sijercic et al. |
| 6,094,401 | A | | 7/2000 | Masak et al. |
| 6,276,218 | B1 | * | 8/2001 | Waers ..... 73/861.22 |
| 6,307,199 | B1 | | 10/2001 | Edwards et al. |

(Continued)

FOREIGN PATENT DOCUMENTS

WO        2012014720 A1    2/2012

OTHER PUBLICATIONS

Sugiura, Junichi, and Stephen Jones. "The Use of the Industry's First 3-D Mechanical Caliper Image While Drilling Leads to Optimized Rotary-Steerable Assemblies in Push-and Point-the-Bit Configurations." SPE Annual Technical Conference and Exhibition. Society of Petroleum Engineers, 2008.*

(Continued)

*Primary Examiner* — Michelle Entezari
(74) *Attorney, Agent, or Firm* — Kimberly Ballew; Mark D. Shelley, II

(57) ABSTRACT

A method for removing cyclic noise from a borehole image includes transforming the image into the frequency domain using a two-dimensional (2-D) transform (e.g., using a discrete cosine transform). The cyclic noise components (peaks) are removed from the transformed image which is then inverse transformed back into the spatial domain using an inverse 2-D transform to obtain a corrected image. An automated method enables the cyclic peaks to be identified and removed from the borehole image via downhole processing.

8 Claims, 7 Drawing Sheets

(56) References Cited

U.S. PATENT DOCUMENTS

| | | | |
|---|---|---|---|
| 6,405,136 B1* | 6/2002 | Li et al. | 702/10 |
| 6,438,195 B1* | 8/2002 | Hsieh | 378/4 |
| 6,584,837 B2 | 7/2003 | Kurkoski | |
| 6,619,395 B2 | 9/2003 | Spross | |
| 6,659,174 B2 | 12/2003 | Hogan | |
| 7,027,926 B2 | 4/2006 | Haugland | |
| 7,558,675 B2 | 7/2009 | Sugiura | |
| 8,422,819 B2* | 4/2013 | Ise | 382/275 |
| 8,655,104 B2 | 2/2014 | Zhang et al. | |
| 2003/0004647 A1 | 1/2003 | Sinclair | |
| 2003/0095180 A1 | 5/2003 | Montgomery | |
| 2003/0151975 A1 | 8/2003 | Zhou et al. | |
| 2004/0162676 A1 | 8/2004 | Thomann et al. | |
| 2004/0178330 A1 | 9/2004 | Tarvin et al. | |
| 2005/0043892 A1* | 2/2005 | Lichman et al. | 702/13 |
| 2006/0222262 A1 | 10/2006 | Ueda et al. | |
| 2006/0256226 A1 | 11/2006 | Alon et al. | |
| 2007/0134804 A1* | 6/2007 | Fisher et al. | 436/164 |
| 2007/0215345 A1 | 9/2007 | Lafferty et al. | |
| 2007/0223822 A1 | 9/2007 | Haugland | |
| 2007/0293181 A1* | 12/2007 | Kimura et al. | 455/302 |
| 2008/0068211 A1 | 3/2008 | Aiello | |
| 2008/0240598 A1* | 10/2008 | Hasegawa | 382/254 |
| 2009/0072744 A1 | 3/2009 | Botto et al. | |
| 2009/0141943 A1 | 6/2009 | Liu | |
| 2009/0157318 A1 | 6/2009 | Woerpel et al. | |
| 2010/0126770 A1 | 5/2010 | Sugiura | |
| 2010/0271232 A1 | 10/2010 | Clark et al. | |
| 2010/0305927 A1 | 12/2010 | Suarez-Rivera et al. | |
| 2010/0322533 A1 | 12/2010 | Zhang et al. | |
| 2011/0175899 A1 | 7/2011 | Bittar et al. | |
| 2011/0214878 A1 | 9/2011 | Bailey et al. | |
| 2011/0245980 A1 | 10/2011 | Nessjoen et al. | |

OTHER PUBLICATIONS

Sugiura, Junichi. "Novel Mechanical Caliper Image While Drilling and Borehole Image Analysis." SPWLA 50th Annual Logging Symposium. Society of Petrophysicists and Well-Log Analysts, 2009.*

Sugiura, Junichi, and Rick Lee. "New Ways of Removing Cyclic Borehole Noise From Low-and High-Resolution LWD Images and Its Impact on Image Interpretation." Canadian Unconventional Resources Conference. Society of Petroleum Engineers, 2011.*

Bellay, Gene, Hilal Al-Waheed, and Thabet Audah. "Cyclic Borehole Effects in Deviated Wells." Abu Dhabi International Petroleum Exhibition and Conference. Society of Petroleum Engineers, 1996. very relevant but does not apply the filter obtained from the power spectra to an image.*

Chen et al. "Hole Quality: Why It Matters", SPE 74403-MS, SPE International Petroleum Conference and Exhibition, Villahermosa, Mexico, 2002, 12 pages.

Fitz et al. "Cyclic noise in open-hole and cased-hole logging measurements: Its impact and remediation," SPE Annual Technical Conference and Exhibition, Denver, Co, Oct. 5-8, 2003, 2003 SPE 84203.

International Preliminary Report on Patentability of PCT Application Serial No. PCT/US2010/039110 dated Jan. 5, 2012.

International Search Report and Written Opinion dated Dec. 6, 2010 for corresponding PCT Application No. PCT/US2010/039110 filed Jun. 18, 2010.

Nieto et al. "Removal of borehole induced noise from well logs," SPWLA 36th Annual Logging Symposium, Jun. 26-29, 1995, pp. 1-11.

Sugiura "Improving Rotary-Steerable Borehole Quality Using Innovative Imaging Techniques", OTC 19991—Offshore Technology Conference, Houston, Texas, May 4-7, 2009, pp. 1-10.

Sugiura "Novel Mechanical Caliper Image While Drilling and Borehole Image Analysis," SPWLA 50th Annual Logging Symposium, Jun. 21-24, 2009.

Sugiura, et al. "The Use of the Industry's First 3-D Mechanical Caliper Image While Drilling Leads to Optimized Rotary-Steerable Assemblies in Push- and Point-the-Bit Configurations." SPE 115395—SPE Annual Technical Conference and Exhibition, Denver, Colorado, USA, Sep. 21-24, 2008, pp. 1-12.

Torres, et al. "Real time frequency domain filtering maximizing vertical resolution while minimizing noise," SWPLA Twenty-Ninth Annual Logging Symposium: Jun. 5-8, 1988, pp. 1-20.

* cited by examiner

CYCLIC NOISE REMOVAL IN BOREHOLE IMAGING

RELATED APPLICATIONS

This application is a divisional of co-pending, commonly-assigned U.S. patent application Ser. No. 12/911,851, filed Oct. 26, 2010, which is a continuation-in-part of commonly-assigned U.S. patent application Ser. No. 12/486,954, filed Jun. 18, 2009, now U.S. Pat. No. 8,655,104, issued Feb. 18, 2014. Each of the aforementioned related patent applications is herein incorporated by reference.

FIELD OF THE INVENTION

The present invention relates generally to a method for removing cyclical noise from borehole images, for example, including logging while drilling images and wireline images. More specifically, this invention relates to processing the borehole images with a two-dimensional transform such as a discrete cosine transform.

BACKGROUND OF THE INVENTION

Logging while drilling (LWD) techniques for determining numerous borehole and formation characteristics are well known in oil drilling and production applications. Such LWD techniques include, for example, natural gamma ray, spectral density, neutron density, inductive and galvanic resistivity, micro-resistivity, acoustic velocity, ultrasonic caliper, physical caliper, and the like. As is well known in the art, LWD has enabled the measurement of such borehole and formation parameters to be conducted during the drilling process. The measurement of borehole and formation properties during drilling has been shown to improve the timeliness and quality of the measurement data and to often increase the efficiency of drilling operations.

Borehole imaging has become conventional in logging while drilling applications. Such images provide an indication of the azimuthal sensitivity of various borehole and/or formation properties. LWD imaging applications commonly make use of the rotation (turning) of the bottom hole assembly (BHA) (and therefore the LWD sensors) during drilling of the borehole. For example, Holenka et al., in U.S. Pat. No. 5,473,158, discloses a method in which sensor data (e.g., neutron count rate) is grouped by quadrant about the circumference of the borehole. Likewise, Edwards et al., in U.S. Pat. No. 6,307,199, Kurkoski, in U.S. Pat. No. 6,584,837, and Spross, in U.S. Pat. No. 6,619,395, disclose similar methods. For example, Kurkoski discloses a method for obtaining a binned azimuthal density of the formation. In the disclosed method, gamma ray counts are grouped into azimuthal sectors (bins) typically covering 45 degrees in azimuth. Accordingly, a first sector may include data collected when the sensor is positioned at an azimuth in the range from about 0 to about 45 degrees, a second sector may include data collected when the sensor is positioned at an azimuth in the range from about 45 to about 90 degrees, and so on.

More recently, commonly assigned U.S. Pat. No. 7,027,926 to Haugland discloses a technique in which LWD sensor data is convolved with a one-dimensional window function. This approach advantageously provides for superior image resolution and noise rejection as compared to the previously described binning techniques. Commonly assigned U.S. Pat. No. 7,558,675 to Sugiura describes another image constructing technique in which sensor data is probabilistically distributed in either one or two dimensions (e.g., azimuth and/or measured depth). This approach also advantageously provides for superior image resolution and noise rejection as compared to prior art binning techniques. Moreover, it further conserves logging sensor data (i.e., the data is not over or under sampled during the probabilistic distribution) such that integration of the distributed data may also provide a non-azimuthally sensitive logging measurement.

One problem with conventional LWD imaging techniques is that the obtained images commonly include cyclical or oscillating noise. For example, a spiralling effect is commonly observed in borehole images. This effect may be caused by a spiralling (or helically shaped) borehole or by periodic oscillations in the borehole diameter. Such cyclic noise often complicates the interpretation of borehole image data, for example, the identification of various geological features and the quantitative determination of formation parameters, such as formation thickness, dip and dip azimuth etc. Therefore, there is a need in the art for improved borehole imaging techniques and in particular a method for removing and/or quantifying cyclical noise on borehole images.

SUMMARY OF THE INVENTION

The present invention addresses one or more of the above-described drawbacks of prior art borehole imaging techniques. One aspect of the invention includes a method for removing cyclic noise from an LWD or wireline borehole image. The image is first transformed into the frequency domain using a two-dimensional (2-D) transform (e.g., including a Fourier Transform or a discrete cosine transform (DCT)). The cyclic noise components (peaks) are removed from the transformed image which is then inverse transformed back into the spatial domain using an inverse 2-D transform to obtain a corrected image. Exemplary aspects of the invention further include an automated methodology by which cyclic peaks may be identified and removed from a borehole image via downhole processing.

Exemplary embodiments of the present invention may advantageously provide several technical advantages. For example, removal of the cyclic noise from a borehole image tends to enable the identification of features (such as thin beds, fractures, vugs, and borehole break-outs) that would not have otherwise been identifiable. Moreover, removal of the cyclic noise also tends to provide for improved accuracy in formation parameter evaluation, such as formation thickness, dip, and dip azimuth angle determination. Images of the cyclic noise may also be advantageously utilized to estimate borehole shape parameters, for example, a spiral period (or frequency) of the well. Evaluation of cyclic noise images along with the BHA configuration and various drilling parameters may also enable the source of the noise to be identified and mitigated, e.g., in subsequent drill runs.

In one aspect the present invention includes a method for removing cyclic noise from a borehole image. The method includes acquiring a borehole image and transforming the acquired image into a frequency domain using a two-dimensional transform to obtain a transformed image. The method further includes removing a cyclic noise component from the transformed image to obtain a filtered transformed image and inverse transforming the filtered transformed image using a two-dimensional inverse transform to obtain a corrected image.

In another aspect, the present invention includes a method for removing cyclic noise from a borehole image. The method includes acquiring at least one cyclic noise frequency and creating a two-dimensional frequency domain filter using the acquired cyclic noise frequency. The method further includes inverse transforming the frequency domain filter to obtain a spatial domain filter. The method still further includes acquiring a borehole image and convolving the acquired borehole image acquired with the spatial domain filter to obtain a corrected image.

In still another aspect, the present invention includes a method for removing cyclic noise from a borehole image. At least one bottom hole assembly spacing is acquired and used to compute at least one corresponding frequency. A two-dimensional filter is created using the at least one computed frequency. A logging while drilling borehole image is acquired and transformed into a frequency domain using a two-dimensional transform to obtain a transformed image. The transformed image is filtered using the created filter and then inverse transformed using a two-dimensional inverse transform to obtain a corrected image.

In yet another aspect, the present invention includes a method for automatically removing cyclic noise from a logging while drilling image downhole during a logging while drilling operation. A borehole image is acquired. At least one vertical section of the image is transformed into a frequency domain using a one-dimensional transform to obtain a power spectrum of the image. The power spectrum is evaluated for cyclic noise peaks and a two-dimensional filter is created using the cyclic noise peak(s). The acquired borehole image is transformed into a frequency domain using a two-dimensional transform to obtain a transformed image which is then filtering using the created two-dimensional filter to obtain a filtered transformed image. The filtered transformed image is then inverse transformed using a two-dimensional inverse transform to obtain a corrected image.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
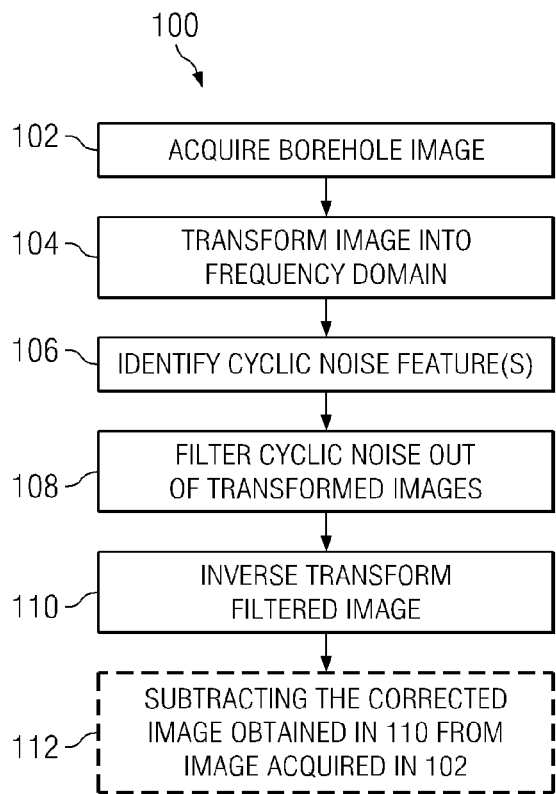
FIG. 1 depicts a flowchart of one exemplary method embodiment in accordance with the present invention.

FIG. 1 depicts a flow chart of one exemplary method embodiment 100 in accordance with the present invention. Method 100 includes acquiring a borehole image at 102. The borehole image may include measurements obtained from substantially any suitable sensor, for example, including at least one natural gamma ray sensor, neutron sensor, density sensor, directional resistivity sensor, micro-resistivity sensor, galvanic resistivity sensor, formation pressure sensor, annular pressure sensor, ultrasonic sensor, audio-frequency acoustic sensor, ultrasonic sensor, or physical caliper sensor, optical sensor, and the like. While the invention is not limited in regards to the sensor type, certain sensors are more susceptible to cyclic borehole affects and therefore to cyclical errors. These include micro-resistivity, ultra-sonic, density, gamma-ray, and physical caliper sensors.

Before proceeding further with a discussion of the present invention, it is necessary to make clear what is meant by the term "image" as used herein. In general an image may be thought of as a two-dimensional representation of a parameter value determined at discrete positions. For the purposes of this disclosure, a borehole image may be thought of as a two-dimensional representation of a measurement (e.g., gamma ray counts, micro-resistivity, etc.) at discrete circumferential positions (e.g., azimuth angles) and measured depths of the borehole. Such images thus convey the dependence of the measurement on the circumferential position and the measured depth. It will therefore be appreciated that one purpose in forming such images is to determine the actual dependence of the sensor measurement (and the corresponding formation properties) on the circumferential position and measured depth. The extent to which a measured image differs from the "true image" may be thought of as image distortion (or noise). Such distortion may be related, for example, to the above described cyclical noise. Removal of this noise source advantageously improves the usefulness of borehole images in determining the actual dependence of the sensor measurements (and therefore formation properties) on the circumferential position and the measured depth of the borehole.

In LWD applications, the circumferential position is commonly referred to as an azimuth angle. In particular, the term azimuth angle refers to the angular separation from a point of interest to a reference point. The azimuth angle is typically measured in the clockwise direction (although the invention is not limited in this regard), and the reference point is frequently the high side of the borehole or measurement tool, relative to the earth's gravitational field, or magnetic north. Another label commonly used in the LWD imaging context is the "toolface" angle. When a measurement tool is used to gather azimuthal imaging data, the point of the tool with the measuring sensor is identified as the "face" of the tool. The toolface angle, therefore, is defined as the angular separation about the circumference of the tool from a reference point to the radial direction of the toolface. In wireline applications, the circumferential position is commonly referred to as a relative bearing (e.g., a bearing angle relative to magnetic north). In the remainder of this document, the term azimuth angle is predominantly used to refer to circumferential positions on the borehole.

With reference again to FIG. 1, the borehole image may be acquired, for example, from a memory type tool (e.g., an LWD or wireline imaging tool) after it has been removed from the borehole (i.e., from tool memory). The borehole image may also be acquired at the surface in real time during logging via a communication link with the downhole tool (e.g., via wireline cable, conventional mud pulse, or other telemetry techniques). As is described in more detail below, the borehole image may also be acquired at a downhole processor where it may be processed in accordance with the present invention. The invention in not limited in these regards.

Methods in accordance with the present invention include transforming the acquired borehole image into the frequency domain at 104 using a two-dimensional (2-D) transform. Suitable 2-D transforms may include, for example, a Fourier Transform, a cosine transform, a sine transform, a polynomial transform, a Laplace transform, a Hartley transform, a wavelet transform, and the like. Preferred transforms may be selected, for example, in view of the ease with which they may be handled via computer algorithms. Cosine transforms (such as the DCT) tend to be advantageous in that they make use of only real-number coefficients (as opposed to complex coefficients). The DCT also tends to advantageously introduce minimal artifacts into the images. In other preferred embodiments "fast" transforms may be utilized, for example, including a 2-D Fast Fourier Transform (FFT) or a Fast Cosine Transform (FCT). Such transforms are commercially available, for example, via software such as MathCad® or Mathematica® (Wolfram Research, Inc., Champaign, Ill.), or MATLAB® (The Mathworks Inc.).

In one exemplary embodiment of the invention, the transformed image may be examined for features indicative of cyclic noise at 106. Cyclic noise is typically manifest as a plurality of periodic peaks (or bright spots) in the frequency domain corresponding to the frequency component (or components) of the noise. For example, a spiraling borehole typically produces cyclic noise having a frequency component related to the period (or frequency) of the spiral. The cyclic noise may be identified manually or using an automated routine as described in more detail below.

Once identified, a filter/mask may be constructed to remove these cyclic noise features from the transformed image at 108. In manual embodiments of the invention, the filter is preferably custom configured for removal of the identified noise features. In this way, there is minimal distortion to the original image. After removal of the cyclic noise feature (s), the transformed image is inverse transformed at 110, for example, using a 2-D inverse transform to obtain a reconstructed (or corrected) borehole image having reduced cyclic noise. Such inverse transforms are also readily available via commercial software packages. After removal of the cyclic noise, the reconstructed image may be evaluated to obtain various borehole and/or formation parameters using techniques known to those of ordinary skill in the art.

In one exemplary embodiment of the invention, the cyclic noise may be removed from the transformed image via multiplying the image by a suitable frequency domain filter. One suitable filter may include a 2-D matrix of zeros and ones, with a predetermined band of frequencies about the cyclic noise frequency (or frequencies) being assigned a value of zero and all other frequencies being assigned a value of one. While such a filter may be suitable for many LWD imaging applications, it may also introduce "ringing" noise when the filtered image is inverse transformed back to the space domain. This noise may be undesirable in certain sensitive applications. In order to minimize ringing noise, the filter may be configured such that the filter coefficients transition more gradually from 0 to 1 or from 1 to 0 (instead of in a single step). This may be accomplished for example via the use of window function (as is known to those of ordinary skill in the signal processing arts). Suitable window functions include, for example, Kaiser, Cosine, Gaussian, Blackman, Hamming, Hanning, Parzen, and Welch windows.

With continued reference to FIG. 1, methods in accordance with the invention may optionally further include subtracting (at 112) the corrected image (obtained at 110) from the original image (acquired at 102) to obtain a cyclic noise image. This cyclic noise image may be further evaluated to provide an indication of borehole quality. When evaluated in real time during drilling, evaluation of the cyclic noise image may help in identifying the source of the noise and its future mitigation. Cyclic noise may also be caused by other periodic sensor noise sources.

Figure 2:
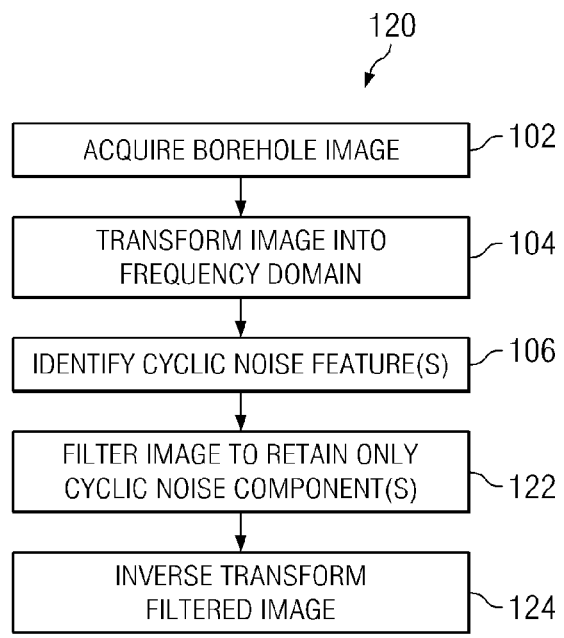
FIG. 2 depicts a flowchart of another exemplary method embodiment in accordance with the present invention.

With reference now to FIG. 2 a flow chart of an alternative method embodiment 120 in accordance with the invention is depicted. Method embodiment 120 is similar to method embodiment 100 (FIG. 1) in that it includes acquiring a borehole image at 102, transforming the image into the frequency domain using a 2-D transform (such as a DCT) at 104, and evaluating the image for cyclic noise features at 106. At 122, a filter is applied to the transformed image so that it retains only the cyclic noise component (peaks) of the transformed image. This filtered image is then inverse transformed (e.g., using an inverse DCT) to obtain a reconstructed borehole image of the cyclic noise at 124. The reconstructed image of the cyclic noise may be evaluated in a similar manner to the image acquire at 112 of FIG. 1 to provide an indication of borehole quality.

Figure 3:
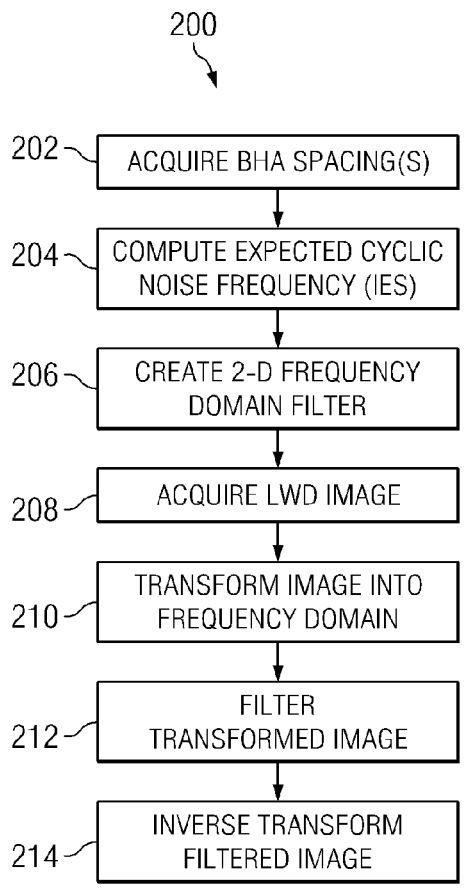
FIG. 3 depicts a flow chart of still another method embodiment in accordance with the present invention.

FIG. 3 depicts a method embodiment 200 in accordance with the present invention for automatically correcting a logging while drilling image. At 202 one or more bottom hole assembly (BHA) spacings are acquired. The BHA spacing typically includes a longitudinal spacing (distance) between first and second longitudinally spaced contact points between the BHA and the borehole wall. These spacing(s) may include, for example, a bit to stabilizer spacing, a bit to trimmer spacing, a bit to pad (or blade) spacing in a system using a rotary steerable tool, and a bit to bend spacing in a system using a bent sub or a steerable motor. Moreover, certain BHA components, such as in-line stabilizers, are typically only a few feet in length. Their presence in a BHA may cause a small variation in the cyclic noise frequency (or period) depending on the touch points. An appropriate filter design may account for this variation, for example, by including a sharp Gaussian distribution about a center frequency of the oscillation.

At 204, the acquired spacing(s) are utilized to compute one or more frequencies at which cyclic noise may be expected, for example, by computing an inverse of the spacing. The frequency response of certain cyclic noise components in borehole images (both formation evaluation (FE) images and caliper images) has been previously shown to be inversely related to certain BHA spacings. For example, a particular BHA spacing of 5 feet may (in certain drilling operations) introduce a cyclic noise component having a frequency on the order of about 0.2 cycles per ft (20 cycles per 100 ft) of borehole depth. This inverse relationship has been published, for example, in (i) Sugiura, *SPWLA 50$^{th}$ Annual Logging Symposium*, June 2009; (ii) Sugiura and Jones, *SPE* 115395, September 2008; and (iii) Sugiura, *OTC* 19991, May 2009.

At 206, a 2-D filter is created from the frequency(ies) computed in 204. Such a filter may include, for example, a 2-D matrix of zeros and ones with the zeros being located at the frequency(ies) computed in 204 (or a band of frequencies about those computed in 204). As described above, the filter may also be configured so as to not have sharp transitions from 0 to 1 or from 1 to 0. The filter coefficients may instead change more gradually from 0 to 1 and 1 to 0, for example by using a Gaussian (or other) window function. At 208 and 210, an LWD borehole image is acquired and transformed into the frequency domain, for example, using one of the 2-D transforms described above with respect to FIG. 1. At 212, the previously determined frequency components are removed from the transformed image, for example, via multiplying the transformed image by the frequency-domain filter created in 206. A corrected image may then be obtained at 214 by inverse transforming the filtered frequency domain image obtained in 212.

Figure 4:
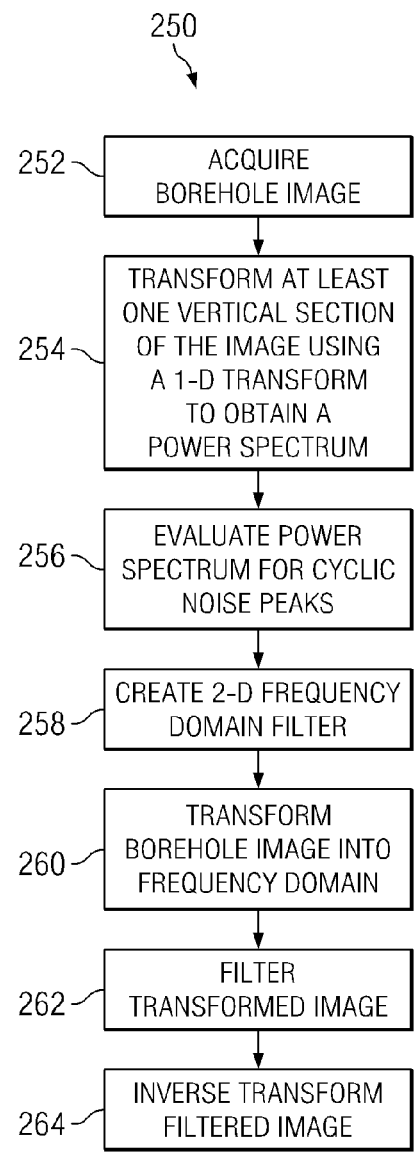
FIG. 4 depicts a flow chart of yet another method embodiment in accordance with the present invention.

FIG. 4 depicts an alternative method embodiment 250 in accordance with the present invention for automatically correcting a logging while drilling image. In method 250 a borehole image is processed automatically to determine the presence and frequency(ies) of cyclic noise. A borehole image is acquired at 252. At least one vertical section (at a constant toolface angle along the measured depth dimension) of the image is transformed into the frequency domain at 254 using a one-dimensional (1-D) transform to obtain a power spectrum of the image. It will be understood that substantially any suitable 1-D transform may be utilized, e.g., including a FFT or a FCT. In preferred embodiments of the invention, a prime numbered plurality (e.g., 3 or 5) of vertical sections are obtained and transformed into the frequency domain. In low-resolution images (e.g., 8 azimuthal sectors) each sector may be 1-D transformed and averaged.

At 256 the at least one power spectrum is evaluated for cyclic noise peaks in a predetermined band of frequencies. The predetermined frequency band is generally in the range from about 0.1 to about 1 cycle per ft (i.e., 10 to 100 cycles per 100 ft) which corresponds with corresponds to BHA spacing in the range from about 1 to about 10 feet. In embodiments in which multiple power spectra are obtained, the power spectra may be averaged prior to the evaluation at 256 so as to reduce noise. Computing an average power spectrum may be advantageous in that it reduces the likelihood of accidentally removing true formation features.

A 2-D filter may then be created at 258 using any cyclic noise peaks obtained in 256, for example, as described above with respect to FIG. 3. At 260, the LWD borehole image is transformed into the frequency domain, for example, using one of the 2-D transforms described above with respect to FIG. 1. At 262, the previously determined frequency components are removed from the transformed image, for example, via multiplying the transformed image by the filter created in 258. A corrected image may then be obtained at 264 by inverse transforming the filtered frequency domain image obtained in 262.

Figure 5:
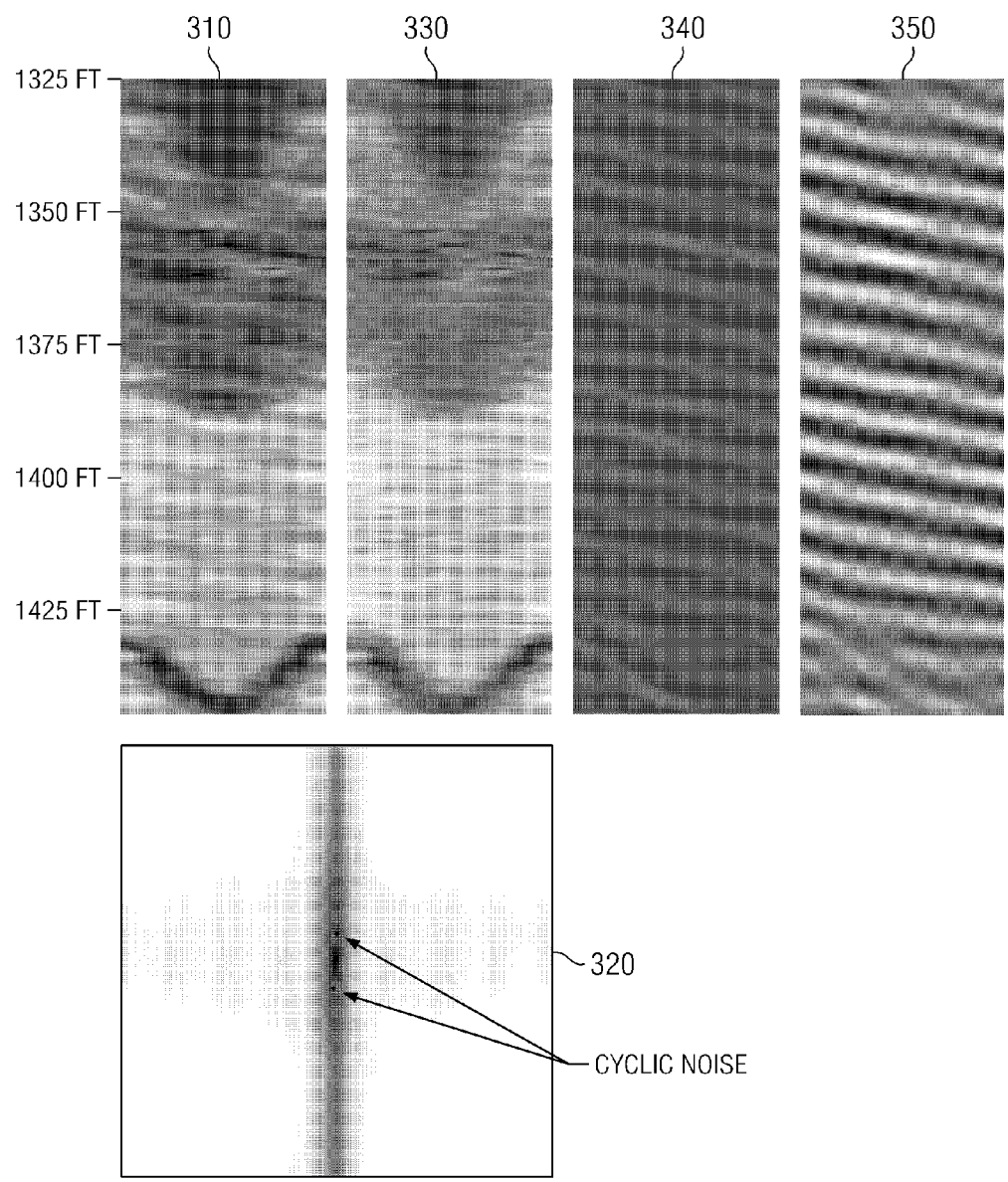
FIG. 5 depicts one example of a borehole image processed in accordance with the present invention.

The present invention is now described in further detail with respect to the following examples, which are intended to be purely exemplary and therefore should not be construed in any way as limiting its scope. Referring now to FIG. 5, an LWD density image is depicted for a section of a subterranean borehole. The original image is shown at 310 and includes a cyclic noise component indicative of a spiraling borehole. This effect is common in borehole imaging applications and is known to have an adverse effect on formation evaluation (Chen et al., *SPE 74403-MS, SPE International Petroleum Conference and Exhibition in Mexico,* 10-12 Feb. 2002).

A 2-D FFT was applied to the original density image to obtain a transformed image in the frequency domain (as described above with respect to FIG. 1). This transformed image is depicted at 320, with the cyclic noise component (dark spots) being depicted (FIG. 5 depicts a negative of the transformed image). The cyclic noise peaks were removed from the transformed image (via a mask) and an inverse 2-D FFT was applied to obtain a corrected image (as described above with respect to FIG. 1). This corrected image is depicted at 330. Visual examination of the corrected image clearly shows that the cyclic noise component has been removed (or significantly reduced in magnitude). As will be appreciated by those of ordinary skill in the downhole logging arts, removal of the cyclic noise component simplifies interpretation of the borehole image. For example, the high density bed (light color) at about 1330 feet is more clearly defined in the corrected image obtained using the present invention. Moreover, the boundary is smooth and is therefore suitable for determination of formation dip. A second high density bed (light color) may also be distinguished at about 1345 feet. The formation structure in this zone (from about 1330 to about 1345 feet) may be interpreted to include first and second thin, high density beds superposed about a thin, low density bed (i.e., a low density bed sandwiched between two high density beds). Prior to removal of the cyclic noise evaluation of these features was difficult (if not impossible).

Figure 6:
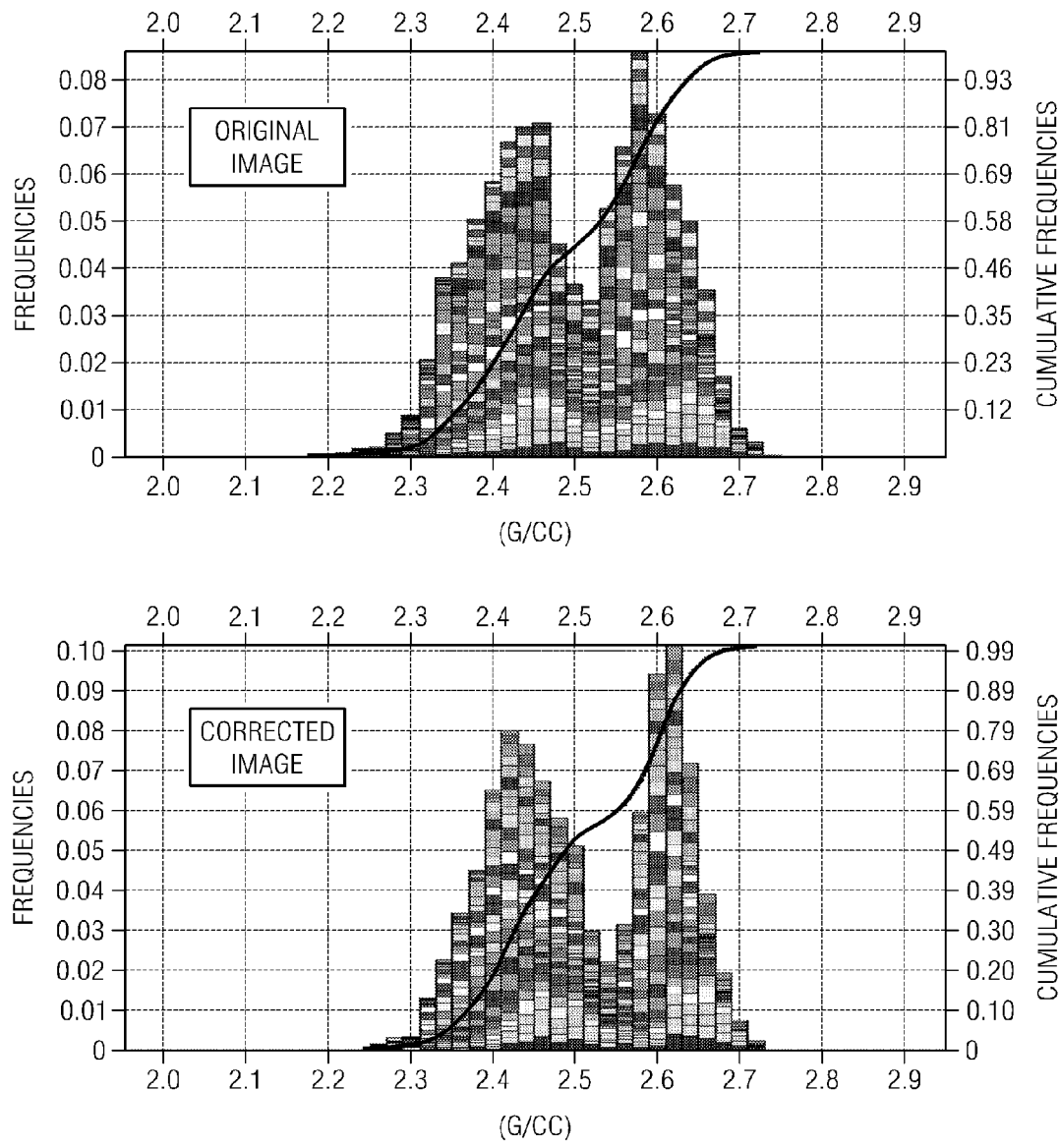
FIG. 6 depicts histograms from the borehole images shown on FIG. 5.

FIG. 6 depicts histograms of the original and corrected images. As shown, the histograms of the original and corrected images remain statistically similar. However, the histogram of the corrected image indicates a slightly higher average density (2.51 g/cc versus 2.50 g/cc). This is to be expected since the LWD density sensor is less likely to contact the borehole wall in a spiraling borehole, which results in density measurements that are more likely to be affected by low density drilling fluid. In a sandstone formation, the density measurements given above correspond to formation average porosity values of 9.1 p.u. and 8.3 p.u., respectively. Removal of the borehole spiral results in a corrected porosity error of 0.8 p.u. (a relative error of about 10 percent).

With reference again to FIG. 5, cyclic noise images are also depicted at 340 and 350. The first cyclic noise image 340 was obtained via subtracting the original image 310 from the corrected image 330. The second cyclic noise image 350 was obtained by retaining only the cyclic noise peaks 322 in the transformed image. All other frequency components were removed prior to the inverse transformation step. These noise images 340 and 350 are similar in that both show a strong borehole spiraling affect. The spirals are regularly spaced having a period of about 6.9 feet (images 340 and 350 show 17 spirals per 117 feet of measured depth). This spiral period is about the same as the distance from the top of the drill bit to the adjustable bend of the drilling motor in the BHA used to drill the borehole (6.9 vs. 6.7 feet), indicating that the BHA configuration may have been at least partly responsible for the spiraling borehole. Evaluation of the cyclic noise may therefore prove useful in identifying and mitigating causes of borehole spiraling.

Figure 7:
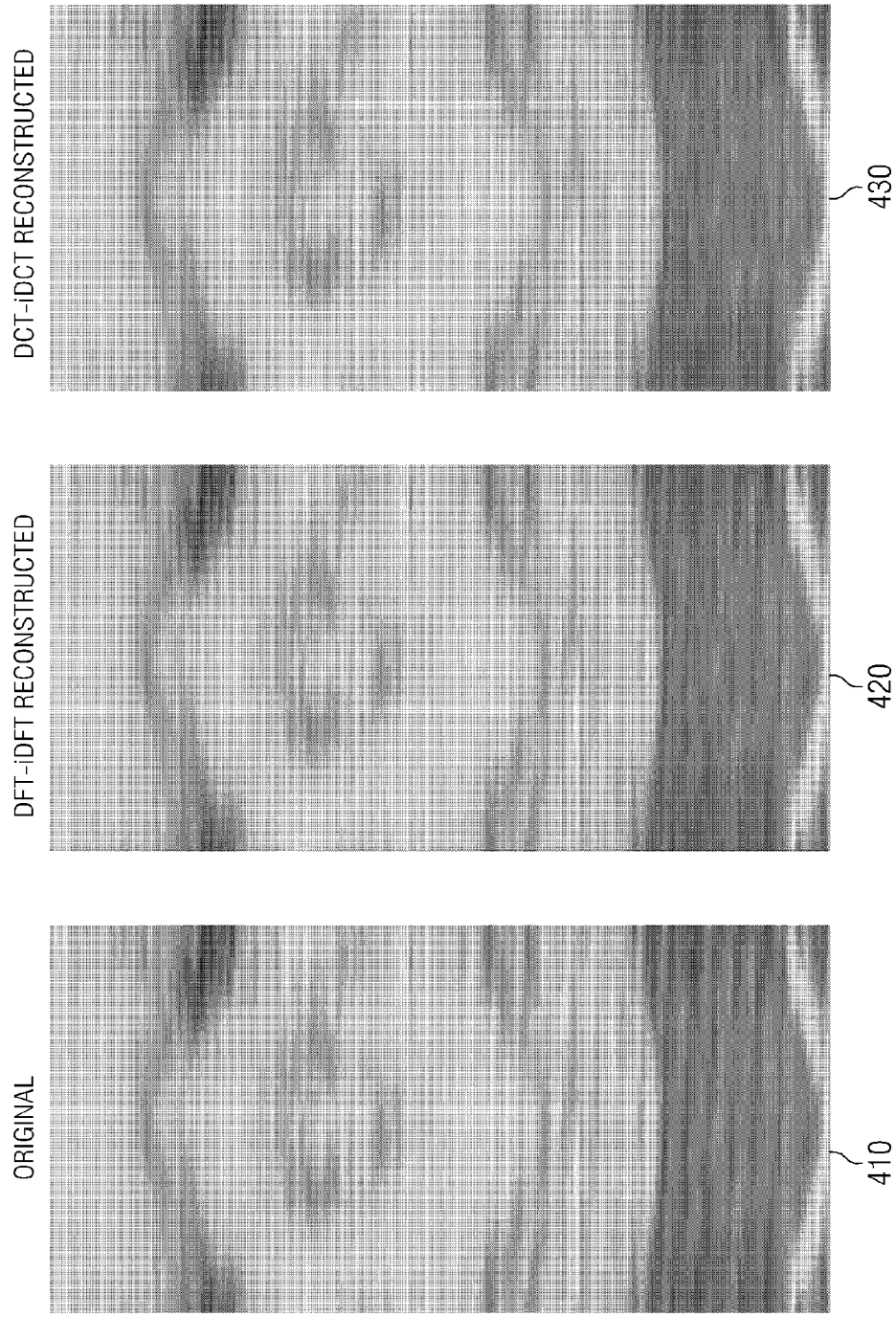
FIG. 7 depicts another example of a borehole image processed in accordance with the present invention.

FIG. 7 depicts another example illustrative of the present invention. The original image is shown at 410 and is similar to image 310 shown on FIG. 5 in that it is a density LWD image that includes a cyclic noise component indicative of a spiraling borehole. A 2-D discrete Fourier transform (DFT) was applied to the original image to obtain a transformed image. The cyclic noise component was removed as described above and an inverse 2-D DFT was applied to obtain a corrected image (depicted at 420 in FIG. 7). A 2-D discrete cosine transform (DCT) was also applied to the original image to obtain a transformed image. The cyclic noise component was removed as described above and an inverse 2-D DCT was applied to obtain another corrected image (depicted at 430 in FIG. 7). Visual examination of the corrected images 420 and 430 clearly shows improvement (in that the cyclic noise component has been essentially fully removed) as compared to the original image 410. Moreover, in the particular example depicted, the DCT transform may provide for a more complete removal of the cyclic noise (although the invention is not limited in this regard).

Figure 8:
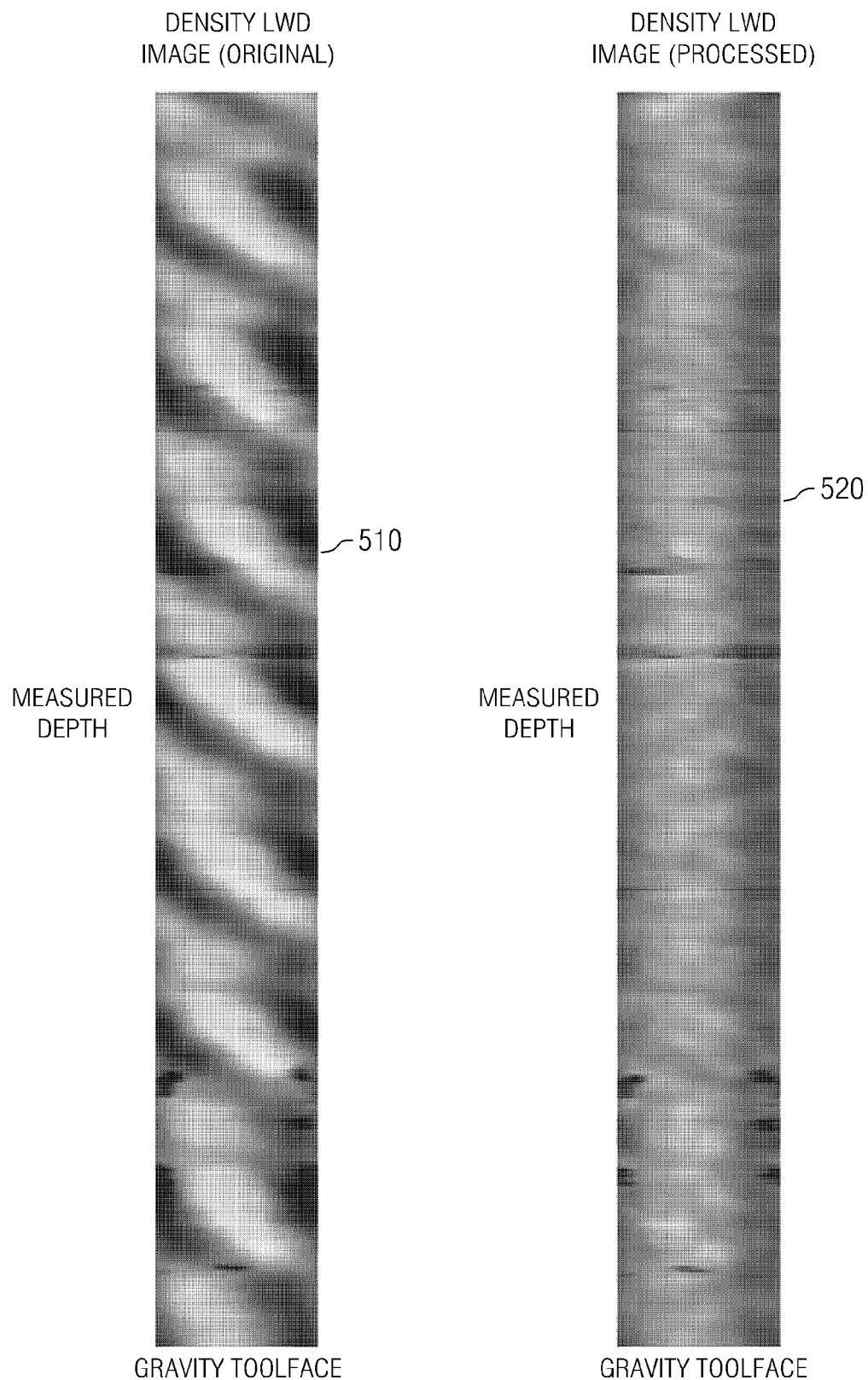
FIG. 8 depicts still another example of a borehole image processed in accordance with the present invention.
Figure 9:
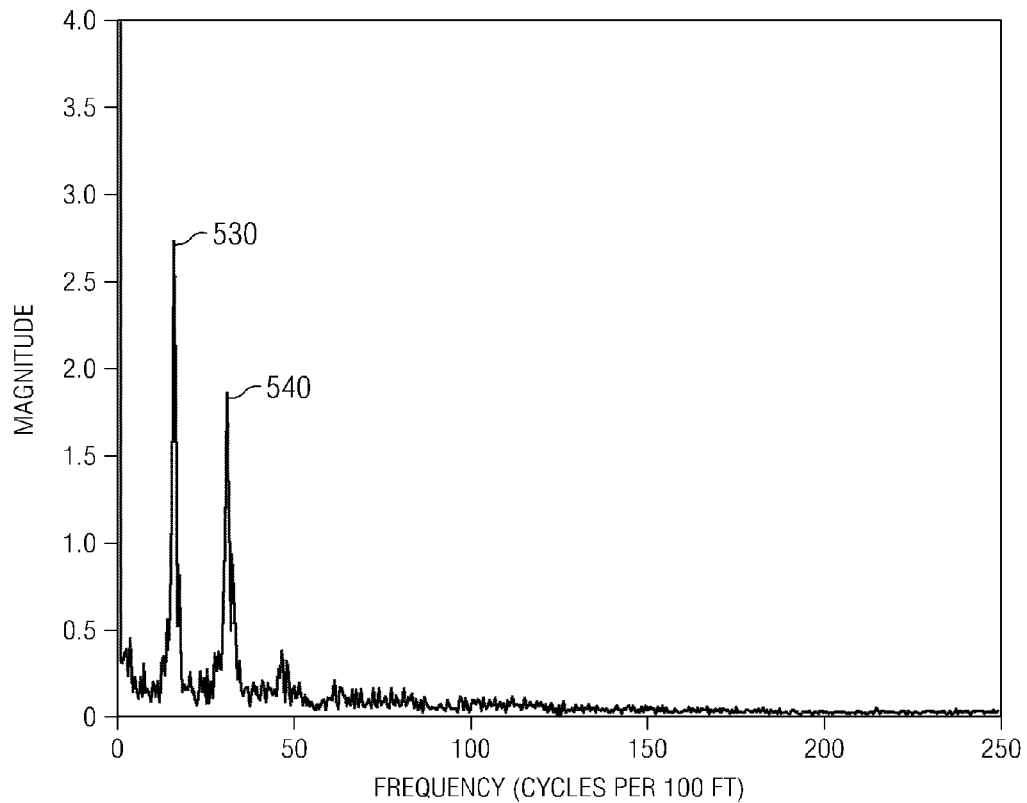
FIG. 9 depicts an average power spectrum taken along the measured depth axis of image 510 on FIG. 8.
Figure 10:
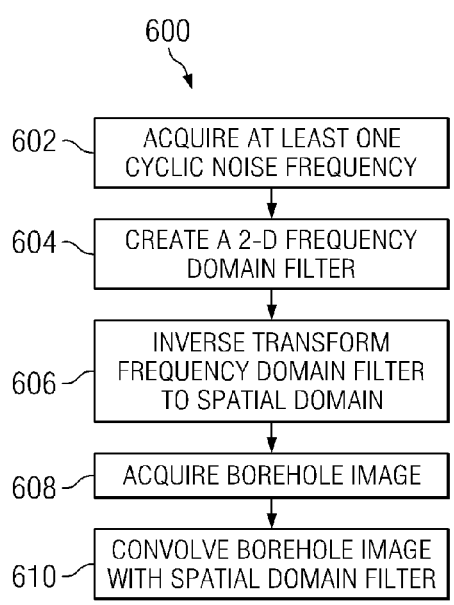
FIG. 10 depicts a flowchart of a further exemplary method embodiment in accordance with the present invention.

FIGS. 8-10 depict still another example illustrative of the present invention (and in particular the exemplary embodiment of the invention depicted on FIG. 4). The original image is shown at 510 on FIG. 8 and is similar to images 310 and 410 described above in that it is a density LWD image including a cyclic noise component indicative of a spiraling borehole. Five 1-D power spectra were obtained using a 1-D FCT. The power spectra were taken along the depth axis of image 510 at tool face increments of 72 degrees (i.e., at 0, 72, 144, 216, and 288 degrees). An averaged power spectrum is depicted on FIG. 9 and clearly depicts first and second cyclic noise peaks 530 and 540 at frequencies of about 16 and 30 cycles per 100 feet. The noise peaks were found using a conventional peak finding algorithm. A range of frequencies about each peak were used to create a two-dimensional binary filter (or mask). Frequencies in the range from 13 to 19 and from 27 to 33 cycles per 100 ft were assigned a value of zero (0). All other frequencies were assigned a value of one (1). The original image was then transformed to the frequency domain using a 2-D DCT. The transformed image was multiplied by the binary filter described above. The filtered image was then inverse transformed back to the spatial domain (using an inverse 2-D DCT). The corrected image is depicted at 520 on FIG. 8.

In the examples described above with respect to FIGS. 5-9, LWD density images were evaluated for the presence of cyclic noise. It will be understood that the invention is not limited to the evaluation of LWD or density images. In other embodiments it may be advantageous to evaluate a first borehole image for the presence of cyclic noise and then use the cyclic noise frequency obtained for the first image to correct a second image. For example, a physical caliper image (e.g., obtained using a conventional 3-D rotary steerable tool) may be evaluated for the presence of cyclic noise. The cyclic noise frequency (or frequencies) obtained from the physical caliper image may then be utilized to construct (create) a 2-D frequency domain filter (e.g., as described above). The filter may then be used to remove cyclic noise components from a formation evaluation image (e.g., a density image or a microresistivity image) obtained in the same section of the borehole. Physical caliper images tend to be highly sensitive to cyclic noise. As such, use of a caliper image to determine cyclic noise frequency tends to improve accuracy and reduce other noise sources. Moreover, in certain embodiments, extracting a cyclic frequency directly from an FE image may be challenging (or even error prone) due to interference of the noise with various formation features such as fractures and formation dips.

FIG. 10 depicts a further exemplary method embodiment 600 in accordance with the present invention. At 602 one or more frequencies (or frequency bands) at which cyclic noise occurs (or may be expected) are acquired. These frequencies may be acquired, for example, via processing one or more BHA spacings (e.g., as described above with respect to FIG. 3) or via a power spectrum of an acquired image (e.g., as described above with respect to FIG. 4). At 604 a 2-D filter is created from the acquired frequency(ies). Such a filter may include (e.g., as described above with respect to FIG. 3) a 2-D matrix of zeros and ones with the zeros being located at the frequency(ies) (or frequency bands) acquired in 602. At 606 the 2-D filter may be inverse transformed from the frequency domain to the spatial domain using a 2-D inverse transformed (e.g., an inverse DCT as described above with respect to FIG. 1). At 608 and 610, a borehole image may be acquired and convolved with the spatial domain filter to obtain a corrected image (in which the cyclic noise has been removed). Those of ordinary skill in the art will readily appreciate that convolution in the spatial domain is mathematically equivalent to multiplication in the frequency domain. Therefore, method 600 may be thought of as being mathematically equivalent to a method in which a frequency domain image (a transformed image) is multiplied with a frequency domain filter prior to inverse transforming.

It will be understood that the aspects and features of the present invention may be embodied as logic that may be processed by, for example, a computer, a microprocessor, hardware, firmware, programmable circuitry, or any other processing device known in the art. Similarly the logic may be embodied on software suitable to be executed by a processor, as is also well known in the art. The invention is not limited in this regard. The software, firmware, and/or processing device may be included, for example, on a downhole assembly in the form of a circuit board, on board a sensor sub, or MWD/LWD sub. Certain embodiments of the invention may be processed downhole automatically during logging while drilling imaging applications. Electronic information such as logic, software, or measured or processed data may be stored in memory (volatile or non-volatile), or on conventional electronic data storage devices such as are well known in the art. The filtering process may be implemented entirely downhole. Filtered images may be transmitted to the surface using a suitable uplink communication channel. Suitable telemetry methods and image compression methodologies are known to those of skill in the art.

Although the present invention and its advantages have been described in detail, it should be understood that various changes, substitutions and alternations can be made herein without departing from the spirit and scope of the invention as defined by the appended claims.

I claim:

1. A method for automatically removing cyclic noise from a logging while drilling image downhole during a logging while drilling operation, the method comprising:
   (a) acquiring a borehole image;
   (b) transforming at least one vertical section of the image acquired in (a) into a frequency domain using a one-dimensional transform to obtain a power spectrum of the image;
   (c) evaluating the power spectrum obtained in (b) for cyclic noise peaks;
   (d) creating a two-dimensional filter using the cyclic noise peak(s) evaluated in (c);
   (e) transforming the borehole image acquired in (a) into a frequency domain using a two-dimensional transform to obtain a transformed image;
   (f) filtering the transformed image obtained in (e) using the filter created in (d) to obtain a filtered transformed image; and
   (g) inverse transforming the filtered transformed image obtained in (f) using a two-dimensional inverse transform to obtain a corrected image.

2. The method of claim 1, wherein the one-dimensional transform is a one dimensional discrete cosine transform or a one-dimensional fast cosine transform.

3. The method of claim 1, wherein the power spectrum is evaluated in (c) in a predetermined band of frequencies, the predetermined band being in the range from about 0.1 to about 1 cycle per foot of measured depth.

4. The method of claim 1, wherein:
a prime numbered plurality of vertical sections are transformed in (b) using a one-dimensional transform to obtain a corresponding plurality of power spectra;
the plurality of power spectra are average to obtain an averaged power spectrum; and
the averaged power spectrum is evaluated for cyclic noise peaks in (c).

5. The method of claim 1, wherein the filter created in (d) comprises a two-dimensional matrix of filter coefficients, a predetermined first band of frequencies about the cyclic noise peaks evaluated in (c) being assigned a value of zero, a second band of frequencies about the first band being assigned transition values between 0 and 1, and all other frequencies being assigned a value of one.

6. The method of claim 5, wherein the transformed image is multiplied by the filter in (f).

7. The method of claim 1, wherein the two-dimensional transform is a Fourier Transform, a cosine transform, a sine transform, a polynomial transform, a Laplace transform, a Hartley transform, or a wavelet transform.

8. The method of claim 1, wherein the logging while drilling image comprises a two dimensional image of a logging sensor measurement at discrete azimuth angles and measured depths in a borehole, the logging sensor measurement being acquired using a micro-resistivity sensor, an ultrasonic sensor, a density sensor, a gamma-ray sensor, or a physical caliper sensor.

\* \* \* \* \*